J. E. BISSELL.
POWER TRANSMISSION DEVICE.
APPLICATION FILED NOV. 14, 1910.
1,007,518. Patented Oct. 31, 1911.
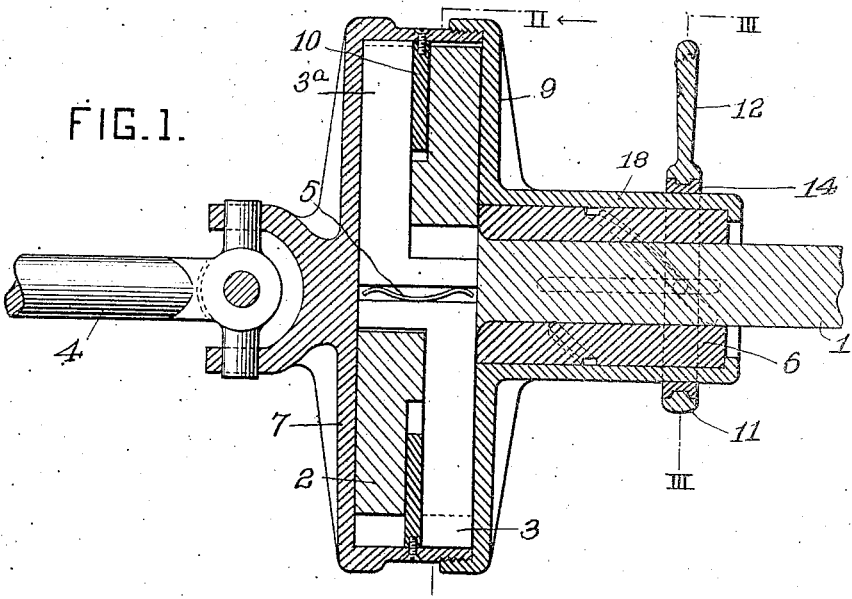
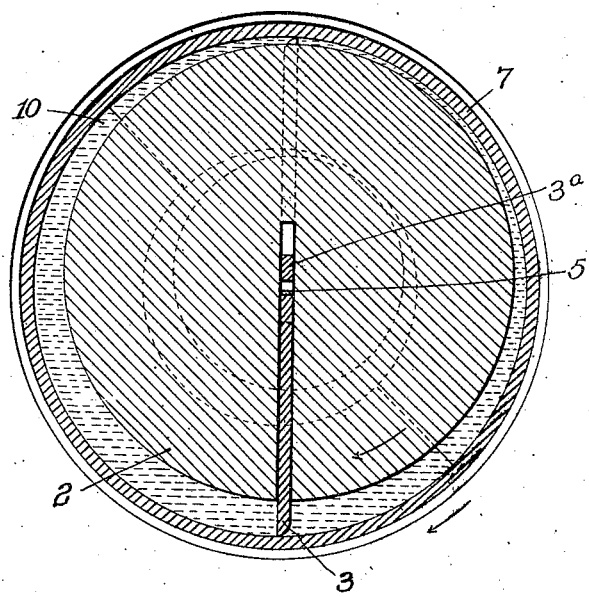
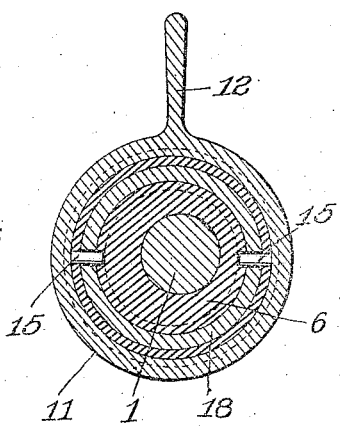
WITNESSES:
J. Herbert Bradley
Theodore Duff
INVENTOR
Joseph E Bissell
by Bayard H. Christy
Attys

UNITED STATES PATENT OFFICE.

JOSEPH E. BISSELL, OF PITTSBURGH, PENNSYLVANIA.

POWER-TRANSMISSION DEVICE.

1,007,518.   Specification of Letters Patent.   Patented Oct. 31, 1911.

Application filed November 14, 1910. Serial No. 592,261.

*To all whom it may concern:*

Be it known that I, JOSEPH E. BISSELL, residing at Pittsburgh, in the county of Allegheny and State of Pennsylvania, a citizen of the United States, have invented or discovered certain new and useful Improvements in Power-Transmission Devices, of which improvements the following is a specification.

My invention relates to certain improvements in power-transmission devices, and the object is to provide a device of this nature in which there is a cushion effect interposed in the line of transmission, to the end that variations in resistance which check the speed of the driven member shall not check to like degree the speed of the driving member. For example, if an automobile whose driving wheels are connected to the engine by unyielding gearing, after traveling over a smooth and level road, starts up the slope of a hill, or runs into a piece of heavy road, the increased resistance to the revolution of the drive wheels may so far cut down the speed that the engine will stop.

My invention is directed to a cushioned transmission device, to take the place of the rigid transmission device commonly employed, primarily to the end that in such an incident as I have above stated the diminution in speed of the vehicle will not have the effect to cut down, in like degree, the speed of the drive member. Consequently, such an increased load as would ordinarily effect the stopping of the engine, if the direct valve were employed, will not necessarily effect the stopping of the engine if this yielding device be employed; but, within much wider limits, the engine will continue to operate to overcome a varying resistance. Furthermore, within permissible limits, the automobile will continue to travel, at reduced speed.

In the accompanying drawings, which illustrate my invention, Figure 1 is a longitudinal section through a power shaft and a transmission device applied thereto, and through a driven member which is driven thereby; Fig. 2 is a transverse section on a plane indicated by line II—II, Fig. 1; Fig. 3 is a transverse section on a plane indicated by the line III—III, Fig. 1.

Referring to these drawings, 1 is the power shaft, and 4 is the driven shaft, shown here in elevation. The power transmission device consists of a cylinder, 7, 9, carried by one of these two members, and a drum, 2, carried by the other one of these two members, the drum being of smaller diameter than the interior diameter of the cylinder, the two members being assembled with the drum within the cylinder. Means are provided to change the relative positions of these two members, so that the drum may be concentrically or eccentrically disposed relatively to the cylinder and the degree of eccentricity varied. The intervening space is filled with a non-compressible liquid, preferably oil. It will be understood, of course, that the cylinder chamber is completely inclosed, and that the oil fills the space completely. An arm or blade 3 extends radially from the drum, and is held in extended position yieldingly by a spring 5, so that, whatever be the distance of the drum from the interior wall of the cylinder, the radial arm will always bear against the cylinder wall. It will be understood that when these members are in eccentric relative positions, if either be driven, power will be transmitted to the other through the interposed body of oil.

In the embodiment shown in the drawings, the power shaft 1 carries the drum 2, and the driven shaft 4 carries the cylinder 7, which cylinder 7 is closed by the cap 9. The cylinder is in this instance partially divided by a partition wall 10 to form, in effect, a double cylinder, and within each cylinder portion is a drum member, and each portion of this double drum is provided with an arm 3, 3ª, extending radially from the drum to the cylinder wall. These radial arms 3, 3ª are placed in diametrically opposite positions, and are held in extended position by the spring 5 inserted between them. This arrangement of a double cylinder and diametrically opposed arms is adopted merely for the sake of balancing the transmission device and making it run smoothly. As particularly shown in Fig. 2, the drum may be eccentric in its position with respect to the containing cylinder. When the drum so positioned is rotated on its axis, carrying with it, in its rotation, the radial arms 3 and 3ª, power will be transmitted through the body of oil which fills the space between the drum and the cylinder, to effect a rotation of the cylinder upon its somewhat eccentric axis. Now, it will be at once apparent that, because of the fact that the driving part and the driven part communicate with one another through the fluid, a sudden increase of resistance, made effective to diminish the speed of rotation of the driven shaft, will not necessarily overload the power shaft 1, with the danger of stopping the engine entirely, but that the fluid body through which the power is transmitted will allow the driven part to travel at a diminished speed relative to the power shaft, or rather it will allow the power shaft to continue to travel at a speed, which, while no doubt diminished, will nevertheless be, so far as concerns the driven member, at a relatively greater velocity. It follows from this that the possibilities of keeping the engine at or near its maximum efficiency under varying conditions of service is very materially increased, when contrasted with the possibilities of the usual rigid drive wheel. My invention further consists in so mounting these two parts that they may be moved relatively to one another; that is, the extent of the eccentricity of one to the other may be varied to meet practical conditions. I consider this adjustability of the eccentricity advantageous to adapt my transmission device in service to starting and stopping and to meet varying conditions of load. It will be understood that, in order to make possible this adjustment in relative eccentricity, there must be two universal joints in the line of connection through the power and driven shafts. I have in Fig. 1 shown one such universal joint at 8. This joint will be duplicated either in the drive or driven shaft, and further illustration is unnecessary.

The sectional view of Fig. 3, taken in connection with Fig. 1, shows in detail how the eccentricity of the cylinder and drum, with respect to one another, may be varied. In this figure it will be seen that the cylinder 7, 9, is provided with a sleeve-like extension 18, which is eccentrically placed upon it, and surrounds the shaft 1. Within this sleeve-like extension 18 is an eccentric block 6, rotatable within the sleeve, and affording bearing for the shaft 1. The sleeve 18 is longitudinally slotted, and the block 6 is provided externally with a spiral groove. A collar 14, movable longitudinally upon sleeve 18, is provided with a pin or lug 15 which extends through the longitudinal slot in the sleeve 18, and into the spiral groove in the block 6. It will be understood that, as the collar 14 is moved longitudinally upon the sleeve 18, the block 6 will be turned, and the eccentricity of the shaft 1, with respect to shaft 4, will be correspondingly varied. The collar 4 may, for convenience in operation, be surrounded with a collar 11, provided with a handle 12. It will of course be evident that the number of grooves, slots and pins for the turning of the block 6 may be varied as desired. Fig. 3 shows two such sets of coacting parts.

I claim herein as my invention:

1. A transmission device for machinery which consists in the combination of a power shaft and a driven shaft mounted for eccentric adjustment with respect to one another, one of the said members carrying a cylinder and the other member carrying a drum, the said drum being inclosed within said cylinder and being of smaller diameter than the internal diameter of the cylinder, and the space surrounding said drum within said cylinder being filled with a fluid, and said drum being provided with a radially extending arm, substantially as described.

2. A power transmission device, consisting in the combination of a power shaft and a driven shaft, one of said members being provided with a cylinder and the other of said members being provided with a drum of less diameter than the internal diameter of the said cylinder and arranged within said cylinder, said drum being further provided with an extensible radial arm, the said drum and the said cylinder being mounted for eccentric adjustment with respect to one another, and means for varying the eccentricity of the drum and cylinder with respect to one another, substantially as described.

3. A transmission device for machinery, which consists in a combination of a power shaft and a driven shaft mounted for eccentric adjustment with respect to one another, one of said members carrying a cylinder and the other of said members carrying a drum, the said drum being inclosed within the said cylinder and being of smaller diameter than the internal diameter of the said cylinder, the chamber of the said cylinder being divided into two cylindrical spaces, and the said drum being correspondingly divided into two drum parts, each of said drum parts being provided with a radially-extending arm, and the radially-extending arms of the two drum parts being opposed to one another in their positions, the space within the cylinder and surrounding said drum being filled with fluid, substantially as described.

4. In a transmission device for machinery, the combination of a power-shaft and a driven shaft and an interposed transmission mechanism, means for changing the relative eccentricity of the two shafts, said means consisting of a cylindrical eccentric block carried on one of said shafts and provided with a spirally-extending groove, a bushing within which the said block turns eccentrically sustained by the other of the two shafts and provided with a longitudinal slot, and a member longitudinally movable upon said bushing and provided with a lug extending through the slot in the said bushing, and engaging the groove of the said eccentric block, substantially as described.

In testimony whereof, I have hereunto set my hand.

JOSEPH E. BISSELL.

Witnesses:
ALICE A. TRILL,
FRANCIS J. TOMASSON.